(12) United States Patent
McCombs et al.

(10) Patent No.: US 10,393,254 B2
(45) Date of Patent: Aug. 27, 2019

(54) UNIVERSAL BELLHOUSING, SYSTEM AND METHOD THEREFORE

(71) Applicant: Accel Performance Group LLC, Bowling Green, KY (US)

(72) Inventors: Ross McCombs, Oskaloosa, IA (US); Joseph Patrick Glenn, Foreston, MN (US)

(73) Assignee: Accel Performance Group LLC, Bowling Green, KY (US)

( * ) Notice: Subject to any disclaimer, the term of this patent is extended or adjusted under 35 U.S.C. 154(b) by 309 days.

(21) Appl. No.: 15/174,052

(22) Filed: Jun. 6, 2016

(65) Prior Publication Data

US 2016/0281835 A1 Sep. 29, 2016

Related U.S. Application Data

(60) Continuation of application No. 14/032,700, filed on Sep. 20, 2013, now Pat. No. 9,360,100, which is a division of application No. 12/258,912, filed on Oct. 27, 2008, now Pat. No. 8,561,283.

(60) Provisional application No. 60/983,347, filed on Oct. 29, 2007.

(51) Int. Cl.
| F16H 57/025 | (2012.01) |
| B21D 22/16 | (2006.01) |
| F16H 57/02 | (2012.01) |
| B21D 53/88 | (2006.01) |

(52) U.S. Cl.
CPC ........... F16H 57/025 (2013.01); B21D 22/16 (2013.01); B21D 53/88 (2013.01); F16H 57/02 (2013.01); *Y10T 29/49996* (2015.01); *Y10T 74/2186* (2015.01)

(58) Field of Classification Search
CPC ....... F16H 57/026; F16H 57/02; B21D 53/88; B21D 22/16; Y10T 29/49996; Y10T 74/2186
USPC ...................................... 464/170; 123/195 C
See application file for complete search history.

(56) References Cited

U.S. PATENT DOCUMENTS

| 157,272 | A | 12/1874 | Conger |
| 603,094 | A | 4/1898 | Worth |
| 1,011,000 | A | 12/1911 | Worth et al. |
| 1,749,917 | A | 3/1930 | Meadowcroft |
| 1,824,440 | A * | 9/1931 | Meyer ................... F16F 15/315 74/606 R |

(Continued)

FOREIGN PATENT DOCUMENTS

| DE | 202015009048 | 9/2016 |
| WO | 2015066500 | 7/2015 |

OTHER PUBLICATIONS

Quicktime Inc. Product Listing Dec. 1, 2005 [online] www.quicktimeinc.com/products.html [retrieved on May 10, 2011], Retrieved from Internet Archive http://replay.web.archive.org.

(Continued)

*Primary Examiner* — Greg Binda
(74) *Attorney, Agent, or Firm* — Middleton Reutlinger

(57) ABSTRACT

A universal bellhousing which may be adapted to a variety of automotive engine and transmission combinations and method of making the same is disclosed. The bellhousing is made by spin forming a sheet of material and welding a transmission plate onto the cone. The cone and transmission plate are indexed to mount to a specified engine-transmission combination.

12 Claims, 6 Drawing Sheets

(56) References Cited

U.S. PATENT DOCUMENTS

| | | |
|---|---|---|
| 2,062,102 A | 12/1932 | Nutt et al. |
| 2,060,773 A | 1/1933 | Pearmain |
| 1,899,274 A | 2/1933 | Hook et al. |
| 1,939,356 A | 12/1933 | Lindgren |
| 2,091,409 A | 8/1937 | Lewis |
| 2,107,954 A | 2/1938 | Morton et al. |
| 2,126,149 A | 8/1938 | Spase |
| 2,674,216 A | 4/1954 | Griffin |
| 2,746,163 A | 5/1956 | Moritz |
| 2,752,675 A | 7/1956 | Bauer |
| 2,825,129 A | 3/1958 | Hempel |
| 2,932,890 A | 4/1960 | Sporck et al. |
| 2,982,150 A | 5/1961 | Kolbe |
| 3,027,960 A | 4/1962 | Ditel |
| 3,072,086 A | 1/1963 | Birchfield et al. |
| 3,075,691 A | 1/1963 | Kelley |
| 3,090,475 A | 5/1963 | Gatewood et al. |
| 3,104,640 A | 9/1963 | Sporck et al. |
| 3,114,342 A | 12/1963 | Sporck et al. |
| 3,187,534 A | 6/1965 | Serope |
| 3,205,688 A | 9/1965 | Paulton |
| 3,222,765 A | 12/1965 | Parent et al. |
| 3,316,745 A | 5/1967 | Berghahn et al. |
| 3,342,051 A | 9/1967 | Leszak |
| 3,355,920 A | 12/1967 | Ellenburg |
| 3,391,439 A | 7/1968 | Bulgrin |
| 3,603,435 A | 9/1971 | Buzzard |
| 3,667,581 A | 6/1972 | Hanks |
| 3,696,689 A | 10/1972 | Senter et al. |
| 3,772,938 A | 11/1973 | Johnson |
| 3,809,192 A | 5/1974 | Stehle |
| 3,841,290 A | 10/1974 | Schubeck |
| 4,016,642 A | 4/1977 | Kraft et al. |
| 4,041,746 A | 8/1977 | Kraft |
| 4,050,321 A | 9/1977 | Kraft |
| 4,055,976 A | 11/1977 | Kraft |
| 4,056,291 A | 11/1977 | Kraft et al. |
| 4,109,542 A | 8/1978 | Kraft |
| 4,254,541 A | 3/1981 | St. John |
| 4,289,008 A | 9/1981 | Steele |
| 4,294,343 A | 10/1981 | Reh |
| 4,478,593 A | 10/1984 | Brown |
| 4,528,734 A | 7/1985 | Beyer |
| 4,579,604 A | 4/1986 | Beyer |
| 4,580,673 A | 4/1986 | Graton |
| 4,599,769 A | 7/1986 | Latzko et al. |
| 4,606,206 A | 8/1986 | Daudi |
| 4,641,547 A | 2/1987 | Stich et al. |
| 4,646,902 A * | 3/1987 | Maruyamano .......... F16D 13/72 |
| 4,674,616 A | 6/1987 | Mannino, Jr. |
| 4,747,284 A | 5/1988 | Hudson |
| 4,848,080 A | 7/1989 | Hofmann et al. |
| 4,936,129 A | 6/1990 | Lipper et al. |
| 4,955,343 A | 9/1990 | Ogami |
| 4,989,657 A | 2/1991 | Lipper |
| 5,094,331 A | 3/1992 | Fujimoto et al. |
| 5,150,777 A | 9/1992 | Friedmann |
| 5,203,441 A | 4/1993 | Monette |
| 5,218,849 A | 6/1993 | Sieger et al. |
| 5,226,516 A | 7/1993 | Novikoff et al. |
| 5,267,488 A | 12/1993 | Hardeman et al. |
| 5,279,182 A | 1/1994 | Fukushima |
| 5,351,796 A | 10/1994 | Uenohara |
| 5,384,949 A | 1/1995 | Wodrich et al. |
| 5,404,979 A | 4/1995 | Craft et al. |
| 5,426,964 A | 6/1995 | Sieger |
| 5,473,808 A | 12/1995 | Winters, Sr. |
| 5,531,088 A | 7/1996 | Inatani |
| 5,566,591 A | 10/1996 | Burkett |
| 5,575,367 A | 11/1996 | Romanelli |
| 5,619,879 A | 4/1997 | Friese |
| 5,634,271 A | 6/1997 | Lipper |
| 5,758,532 A | 6/1998 | Massee |
| 5,775,151 A | 7/1998 | Massee |
| 5,782,324 A | 7/1998 | Wall |
| 5,836,431 A | 11/1998 | Jackel |
| 5,845,757 A | 12/1998 | Csonka |
| 5,857,547 A | 1/1999 | Dequesnes |
| 5,896,971 A | 4/1999 | Hein |
| 6,042,935 A | 3/2000 | Krenkel et al. |
| 6,056,099 A | 5/2000 | Jacket et al. |
| 6,065,578 A | 5/2000 | Nakatani et al. |
| 6,073,517 A * | 6/2000 | Pauwels ................ F04C 29/005 74/606 R |
| 6,189,357 B1 | 2/2001 | Baumgarten et al. |
| 6,199,419 B1 | 3/2001 | Shrayer et al. |
| 6,263,749 B1 * | 7/2001 | Wesley .................. B60K 17/28 |
| 6,561,002 B2 | 5/2003 | Okada et al. |
| 6,568,518 B2 | 5/2003 | Sarar |
| 6,601,284 B1 | 8/2003 | Wall |
| 6,694,791 B1 | 2/2004 | Johnson et al. |
| 6,701,617 B2 | 3/2004 | Li et al. |
| 6,705,263 B2 | 3/2004 | Ito et al. |
| 6,731,043 B2 | 5/2004 | Pritchard et al. |
| 6,823,705 B2 | 11/2004 | Fukuda et al. |
| 7,091,635 B1 | 8/2006 | Gilliland et al. |
| 7,097,006 B2 | 8/2006 | Veneziano |
| 7,097,007 B2 | 8/2006 | Lin |
| 7,124,609 B1 | 10/2006 | Hermanson |
| 7,152,446 B2 | 12/2006 | Wada et al. |
| 7,228,629 B2 | 6/2007 | Beyer |
| 7,243,517 B2 | 7/2007 | Sieger |
| 7,798,301 B2 | 9/2010 | Keating et al. |
| 8,146,719 B2 | 4/2012 | Antanaitis et al. |
| 8,561,283 B1 | 10/2013 | McCombs et al. |
| D726,531 S | 4/2015 | Muzic |
| 9,360,100 B2 | 6/2016 | McCombs et al. |
| D760,582 S | 7/2016 | Muzic |
| 9,482,308 B2 | 11/2016 | McCombs |
| 9,518,645 B2 | 12/2016 | McCombs |
| 9,739,343 B2 | 8/2017 | McCombs |
| 2003/0005792 A1 | 1/2003 | Ninomiya et al. |
| 2003/0015058 A1 | 1/2003 | Bell |
| 2003/0145676 A1 | 8/2003 | Bennefous et al. |
| 2004/0040802 A1 | 3/2004 | Veneziano et al. |
| 2005/0010328 A1 | 1/2005 | Ikeda et al. |
| 2006/0090591 A1 | 5/2006 | Graeve |
| 2006/0231369 A1 | 10/2006 | Bassett et al. |
| 2006/0272378 A1 | 12/2006 | Amino et al. |
| 2007/0039366 A1 | 2/2007 | Michel et al. |
| 2008/0179870 A1 | 7/2008 | Theodore |
| 2009/0301153 A1 | 12/2009 | Tachi |
| 2010/0116603 A1 | 5/2010 | Kitchell |
| 2012/0186385 A1 | 7/2012 | McCombs |
| 2012/0186386 A1 | 7/2012 | McCombs |
| 2012/0186936 A1 | 7/2012 | McCombs |
| 2014/0020505 A1 | 1/2014 | McCombs et al. |
| 2015/0122066 A1 | 5/2015 | McCombs |
| 2015/0300420 A1 | 10/2015 | Kirchhoffer |
| 2015/0377304 A1 | 12/2015 | McCombs |
| 2016/0069416 A1 | 3/2016 | Kowalski |
| 2017/0045115 A1 | 2/2017 | McCombs |
| 2017/0234402 A1 | 8/2017 | McCombs |

OTHER PUBLICATIONS

SFI Foundation Inc., "Specification LIst", www.sfifoundation.com/speclist.html. Printout from Internet Oct. 26, 2007.

Speedway Motors, Explosion-Proof Chevy Bellhousing With Plate;, www.speedwaymotors.com/p/545,37, Printout from Internet Oct. 25, 2007.

Definition of "Bell housing", Wikipedia page printout from Internet Oct. 28, 2007.

"List of Chrysler bellhousing pattens", Wikipedia page printout from Internet Oct. 28, 2007.

Definition of "Hydroforming", Wikipedia page printout from Internet Oct. 28, 2007.

Definition of "Metal spinning", Wikipedia page printout from Internet Oct. 28, 2007.

Engineers Edge, "Metal Spinning", diagram illustrating "outside" type metal spinning, Page printout from Internet Oct. 28, 2007.

Globalspec, About Metal Spinning Services examples of metal spinning, Page printout from Internet Oct. 28, 2007.

(56) References Cited

OTHER PUBLICATIONS

Belway B.P. et al. (2006). ASM Handbook, vol. 14B—Metalworking: Sheet Forming . . . ASM International. pp. 367-374.
Tremec Corporation T-56; Tremec Transmissions 2012 Performance Product Guide Mar. 24, 2015. Retrieved from www.archive.org Nov. 2, 2017.
Transmittal Letter of Related Cases dated Nov. 13, 2018.
Utility U.S. Appl. No. 15/495,492 entitled Bellhousing Alignment Device and Method filed Apr. 24, 2017.

* cited by examiner

UNIVERSAL BELLHOUSING, SYSTEM AND METHOD THEREFORE

CROSS-REFERENCE TO RELATED APPLICATION

This application is a continuation of U.S. patent application Ser. No. 14/032,700 filed on Sep. 20, 2013, now U.S. Pat. No. 9,360,100, which is a divisional application of U.S. patent application Ser. No. 12/258,912, now U.S. Pat. No. 8,561,283, which claims priority to U.S. Provisional Application No. 60/983,347 filed on Oct. 29, 2007. The disclosure of these applications are hereby incorporated by reference in their entirety.

TECHNICAL FIELD

Exemplary embodiments of the present invention relate generally to an apparatus to connect an engine to a transmission and a method of fabricating said apparatus.

BACKGROUND

Transferring power from a rotating engine or motor to a transmission or other implement requires an attachment mechanism to absorb the rotational torque differential between the engine and the desired transmission or implement. The attachment maintains a specific relationship of the components to prevent unwanted loss of energy from friction associated with misalignment of the rotating shaft from the motor with a transmission or other component. Additional consideration is given for the forces generated from the environment the assembly is to be employed. In an internal combustion engine, the area between the engine and the transmission is commonly called a bellhousing. Historically Automobile, Truck, and Implement Manufacturers have provided their bellhousings from several processes; namely metal casting; metal pressing using dies and presses and occasionally a hydro form pressing method requiring a less costly form of die.

A bellhousing also provides an area for controlling power transfer from the motor to the attachment to it.

Inside the bellhousing a clutching mechanism and often a starting system for the motor is placed. The bellhousing encapsulates these mechanisms protecting the components from the outside environment and hopefully contains any failure of the components within the bellhousing.

Bellhousings are attached to the motor with taps and commonly to the transmission or implement with taps. The pattern of the tapped holes varies from manufacturer to manufacture and from motor type to motor type as well as transmission type to transmission type. Additional variations occur within subgroups from above to accommodate the clutching and starting systems required for each application. Manufacturers most often design and build a casting from aluminum or iron for each application. The process requires a large commitment of capital and time designing the molds. They can only justify the large initial startup costs through the economics of mass production.

The manufacturer is faced with a tradeoff of weight versus strength when selecting either aluminum or steel. In the marketplace there has developed a need for a lighter weight steel bellhousing to accommodate the manufacturer's production needs. New high torque engines create stresses that cause failure of the traditional cast bellhousing.

In areas of motor sports all the circumstances above; flexibility of application; strength versus weight; production cost; and safety are equally important. Most motor-sport sanctioning bodies are now requiring bellhousings capable of containing all the components within the bellhousing in the event of a failure. Most require a steel bellhousing. Modern engines are producing torque in excess of the design parameters of traditional bellhousing. The consumer desires an affordable and safe bellhousing that can be tailored to multiple combinations common in their competition. This market is not economically viable for traditional mass production methods since the price per piece is not sufficiently off set by production numbers.

Automotive restoration and modification has demands similar to the motor sport consumer. The flexibility and strength of the spun bellhousing enables combinations of almost any imaginable at a reasonable cost. Likewise, all high torque, limited production applications of rotating energy from a motor to an attachment will benefit from the lower per unit cost of spun bellhousing.

BRIEF SUMMARY OF THE INVENTION

A summary of certain embodiments of the invention disclosed herein is included below. It should be understood that these aspects are presented for purposes of providing the reader with summary of these embodiments and that these aspects are not intended to limit the scope of this disclosure. Indeed, this disclosure may encompass a variety of aspects that may not be set forth below.

The present invention generally relates to an improved attachment, hereafter "bellhousing," for use in rotating power transmission systems. The bellhousing is formed from a sheet of metal into a generally coned shaped housing having an integrally formed flange extending from the cone. A plate is attached onto the opposing end of the cone that attaches to a transmission or other implement. This assembly is then machined and cut to accommodate any number of motor to transmission or implement combinations.

The process reflects the latest in technological advances in metallurgy and metal spinning. When first introduced, modem high strength alloys exceeded the existing capabilities of traditional metal spinning. Recent improvements in metal spinning now allow high strength alloys to be formed in a spin forming machine.

A spun bellhousing from a high strength alloy maintains its shape since the spin forming eliminates residual stress associated with traditional pressing methods. The combination of modem alloys and high power spinning machines eliminates the costly development of molds for casting or forms for pressing or hydro forming. The finished product is stronger, lighter, and more stable than traditional pressed or cast attachments. The process allows short production runs decreasing per unit costs and the benefits of infinite flexibility. Modem spin forming and alloys provide a safer, stronger more stable product with fewer costs than the other processes.

The present invention generally relates to an improved bellhousing for use in an automobile, the bellhousing being formed by spin forming a sheet of metal into a generally cone shaped housing having an integrally formed flange extending from the cone. A transmission plate is then welded onto the cone. Finally, the transmission plate and integrally formed flange are shaped and cut to accommodate any of a number of engine and transmission combinations.

The process of making such a bellhousing does not require the development of forms, such as those required for hydroforming or pressing, and may be formed from a steel plate, thereby increasing the safety factor of the bellhousing.

Additionally, a variety of engine and transmission combinations may be used without expensive or weighty adapter plates between the bellhousing and engine or transmission. The spin forming step also eliminates residual stress in the bellhousing, further increasing its safety qualities.

Again, the brief summary presented above is intended only to familiarize the reader with certain aspects and contexts of embodiments of the present disclosure without limitation to the claimed subject matter.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Figure 1:
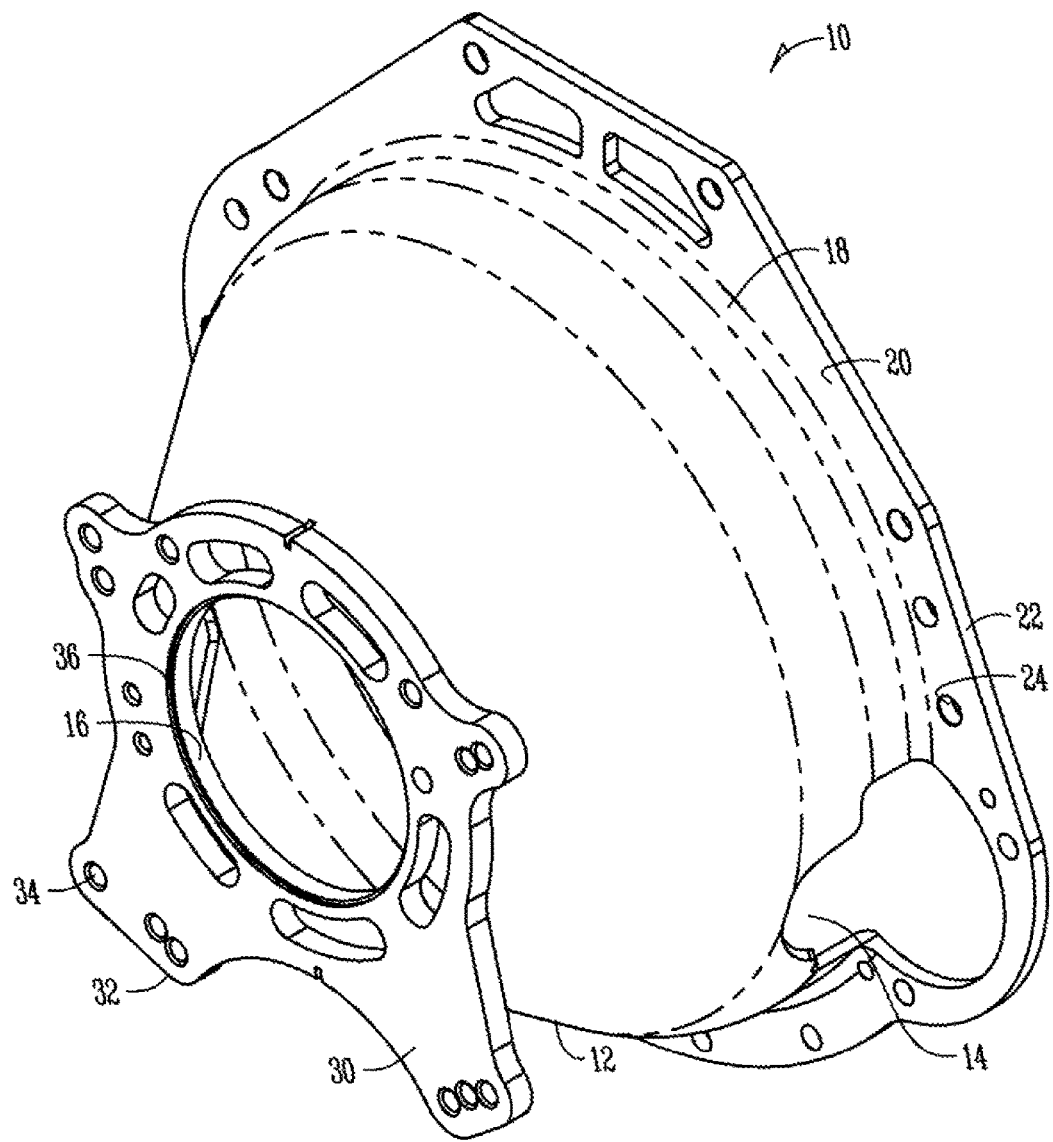
FIG. 1 is a perspective view of the bellhousing according to a preferred embodiment.
Figure 2:
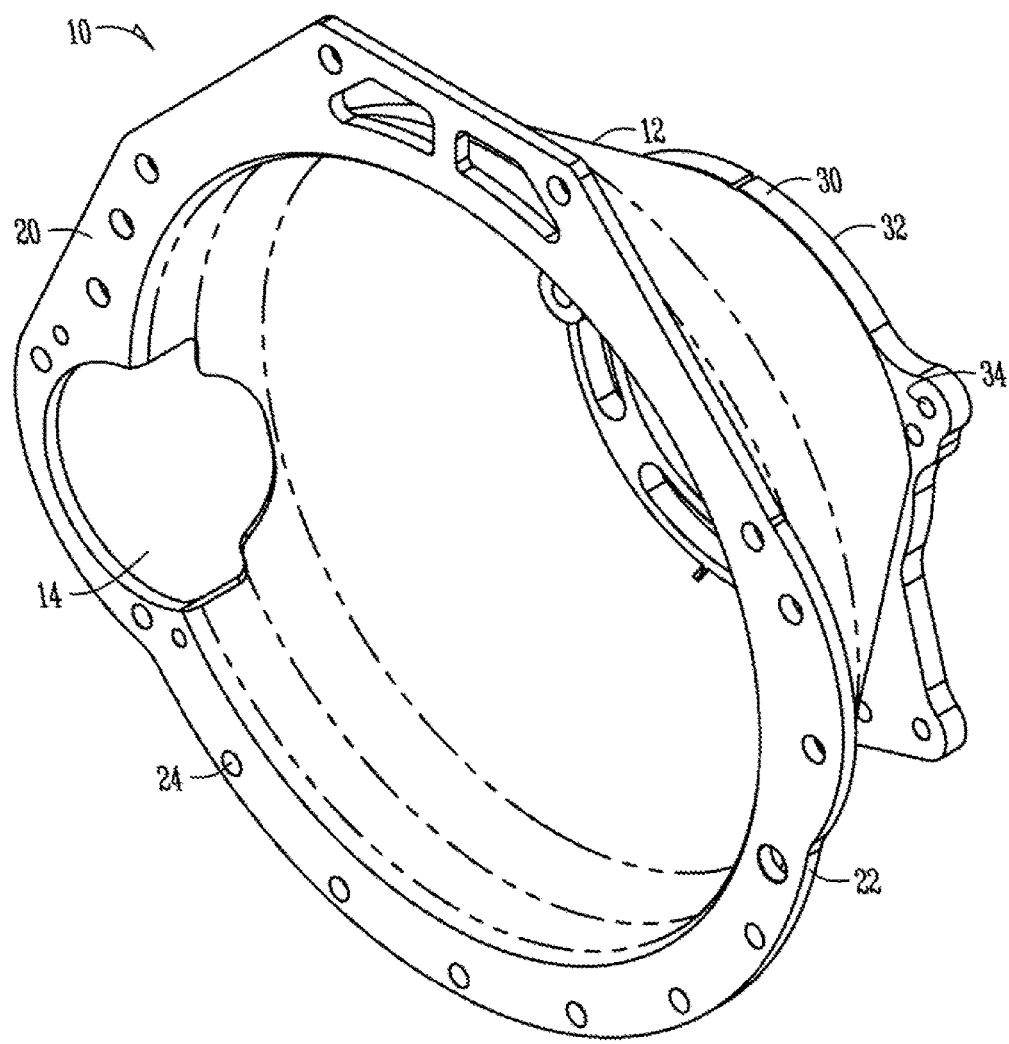
FIG. 2 is a perspective view of the bellhousing from an opposite end.
Figure 3:
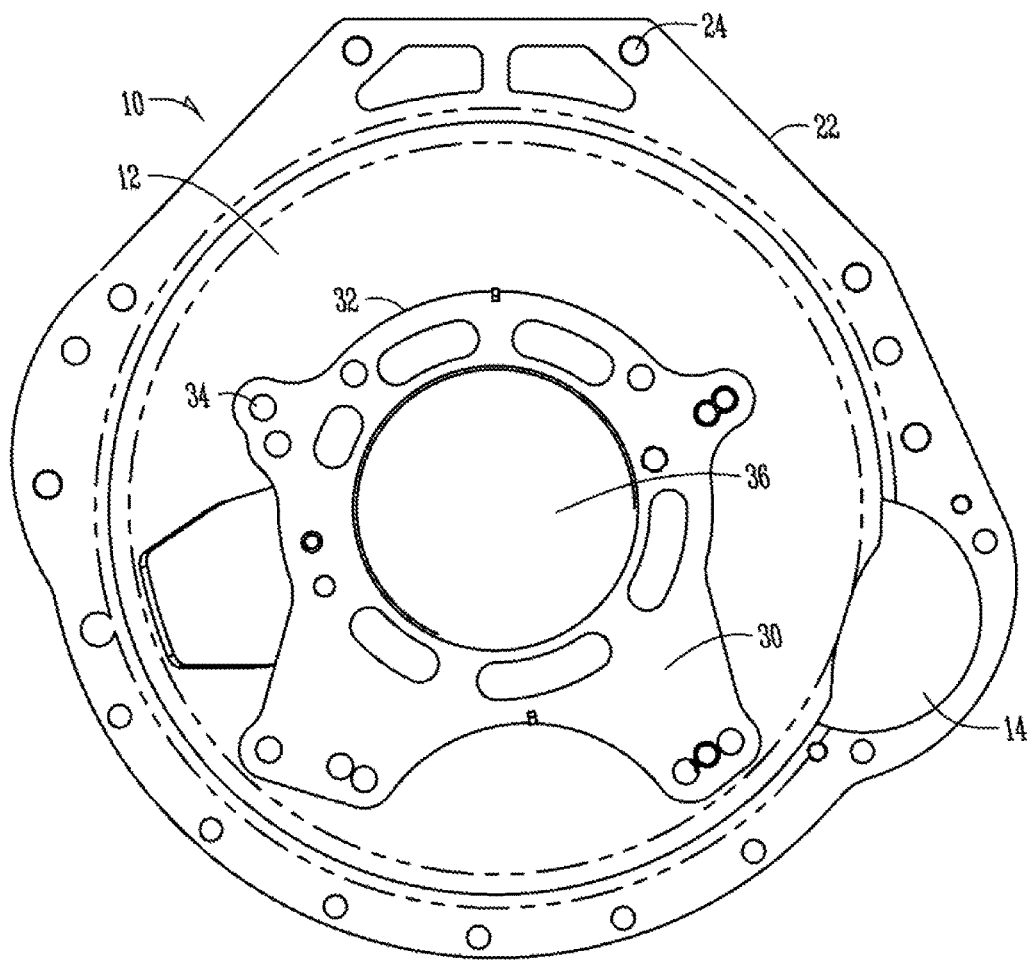
FIG. 3 is an end view of the preferred embodiment.
Figure 4:
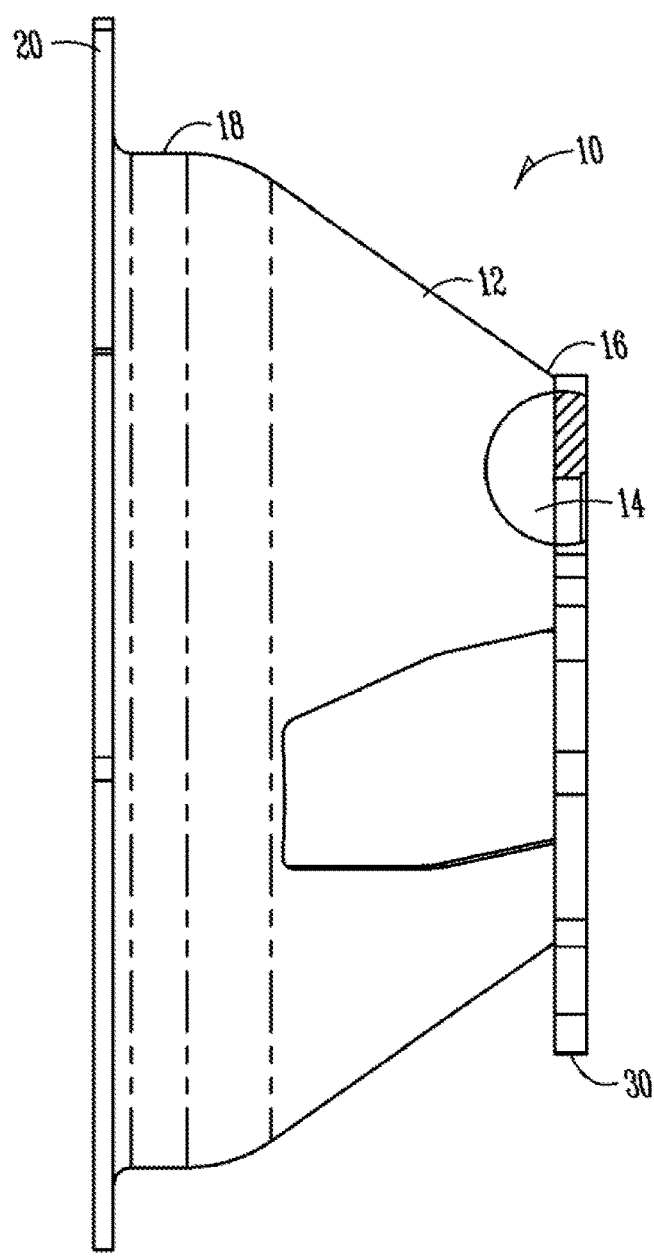
FIG. 4 is a side view of the preferred embodiment.

An embodiment of this invention is a universal bellhousing design and manufacturing process that allows a small number of housing sizes to be configured to mate with a large number of engine and transmission models. This is an important aspect of this invention as each engine and transmission has a unique mounting pattern and size and thus would require separate tooling.

As shown in FIGS. 1-4, the bellhousing 10 generally comprises a cone 12, a flange 20, and a transmission plate 30. The flange 20 has a hole pattern 24 corresponding to a mating surface on an engine. The transmission plate 30 also has a hole pattern 34 and a profile 32 corresponding to a transmission. The cone 12 also features a number of openings 14 which allow the bellhousing 12 to fit about the engine transmission interface while allowing access for the shifter cable and starter. The arrangement of the openings 14, and the hole pattern 24 on the flange 20 and hole pattern 34 on the transmission plate 30 are shown merely by example, as each engine-transmission combination may require different shapes or arrangement of these features.

As previously discussed, there are different methods available for the construction of bellhousings. These methods include hydroforming, casting, or pressing. Each of these methods is not preferable for custom made bellhousings because of an increased startup cost as well as limitations in the type of material which may be used.

The present invention contemplates the use of spin forming to form the basic bellhousing shape. The process is generally shown in FIGS. 5A and 5B, with the specific assembly process for the bellhousing shown in FIG. 6.

Figure 5A:
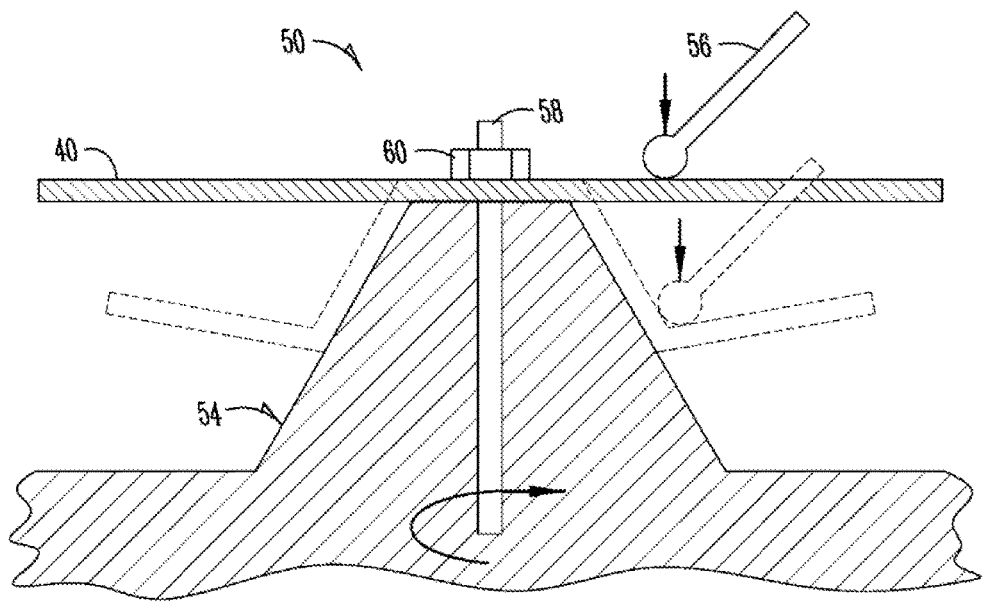
FIG. 5A shows a method of forming the bellhousing by use of an internal spin forming machine.
Figure 5B:
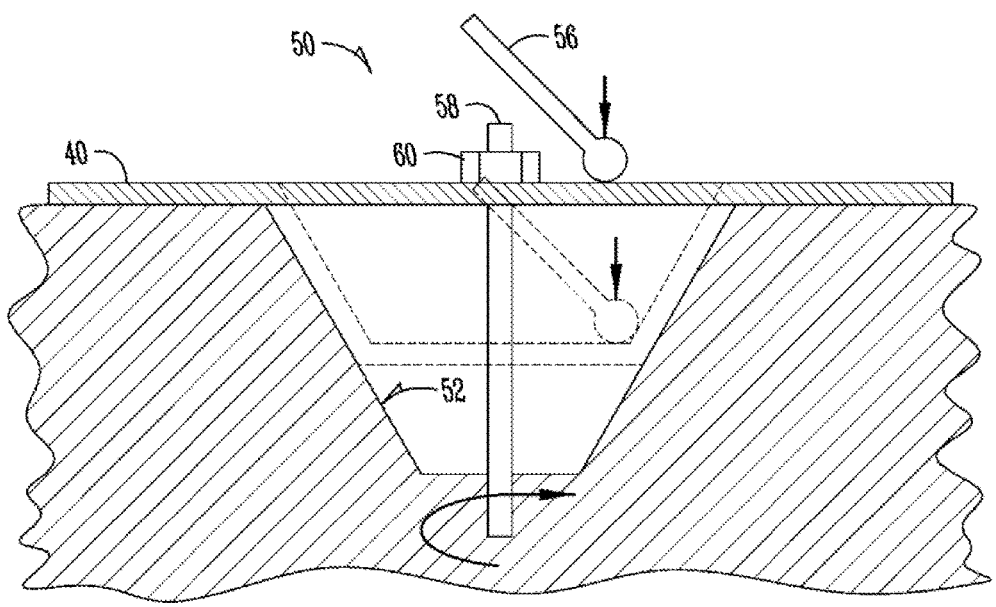
FIG. 5B shows a method of forming the bellhousing by use of an external spin forming machine.

FIGS. 5A and 5B show alternative methods of spin forming a sheet of steel into a cone for use in the bellhousing. FIG. 5A shows the use of an internal type spin forming and FIG. 5B shows the use of an external type spin forming.

FIG. 5A shows internal-type spin forming. A sheet of steel 40 is placed onto the spinning machine 50 with the central axis 58 passing through the indexing hole 42. The sheet 40 is then secured by a support 60 and spun at a high speed. As the sheet 40 spins, a roller 56 exerts force downward onto the sheet 40 forcing it into the cavity 52. The sheet 40 is shaped to the cavity 52 while leaving a flange 20 integrally formed about the edge of the cavity 52.

External spin forming is generally shown in FIG. 5A. In this method, a sheet of steel 40 is placed onto a spinning machine 50 atop a mandrel 54. The central axis 58 passes through the indexing hole 42 and the sheet 40 is secured with a support 60. The sheet 40 is then spun at high speed and a roller 56 forces the sheet about the mandrel 54. In this manner, a cone shape is formed about the mandrel with a flange 20 integrally formed with the cone 12. As shown in FIG. 5B, once the cone 12 is formed, the flange 20 is not level to the cone 12. Therefore, a separate step is required to level the flange 20 prior to final machining. This step could be performed by a press or other similar process known in the art.

Figure 6:
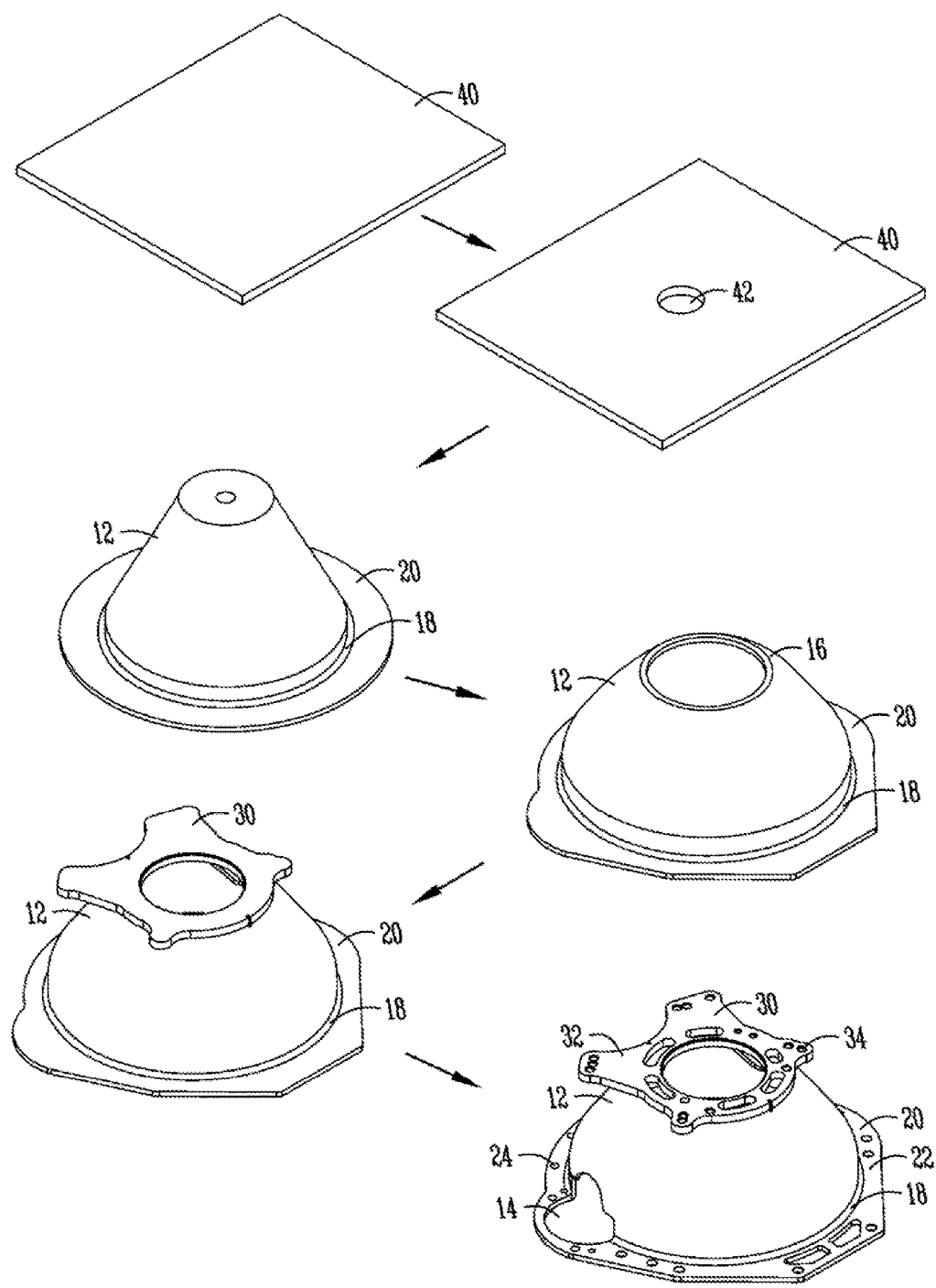
FIG. 6 shows the various steps in producing the bellhousing according to the preferred embodiment.

As shown in FIG. 6, an exemplary embodiment of the process starts with a single sheet 40 of steel, preferably ⅜" for safety reasons.

Next, an indexing hole 42 is drilled through the center of the sheet 40; this hole 42 is preferably approximately 1" in diameter and is used to align the sheet 40 onto the spinning machine 50.

The sheet 40 may then be formed by spin forming into a cone 12 with a narrow end 16, a wide end 18, and a flange 20 extending from the wide end 18. The cone is defined by its height, diameter and angle of taper.

The cone 12 is next cut to a preferred height relative to the flange 20. This distance is determined by the precise specifications between the engine and transmission. Along with cutting the cone height, noncritical operations are also performed. The openings 14 are also cut and the profile 22 of the flange is cut. These features are not held to the tight tolerances of the transmission and engine interfaces, and so may be performed at this stage. The cuts are preferably performed by an automated 5-axis laser cutter. Being automated, such as by computer numerical control (CNC), individual bellhousing profiles may be stored and retrieved according to production demands. The 5-axis laser cutter eliminates error due to moving the part and allows cuts to be made at a variety of positions and angles.

The transmission plate 30, already having a profile 32 and center hole 36 for aligning with the transmission, is then welded onto the narrow end 16 of the cone 12. As with the flange profile 22, the transmission profile 32 is not required to be held to a tight tolerance. Therefore, a number of transmission plates 30 corresponding to a variety of different transmissions may be cut before welding the transmission plate 30 to the bellhousing 10. The central hole 36 of the transmission plate 30 is within a tolerance (e.g., 0.1") of the final dimension. This central hole 36 is centered onto the cone 12, thereby ensuring concentricity between the flange 20 and transmission plate 30.

As a final step, the bellhousing 10 is moved to a table for precision machining. First, the transmission plate 30 and flange 20 are leveled relative to one another to a precision tolerance (e.g., 0.001"). The hole pattern 24 in the flange 20 is then cut, including precision fit dowels. The central hole 36 and hole pattern 34 of the transmission plate 30 are also cut at this time, corresponding to the selected transmission.

All of the operations in the final step are performed on a single machine, thereby ensuring a precise tolerance (e.g., 0.001").

As has been previously described, the method of forming the bellhousing allows for a variety of transmission and engine combinations to be assembled together through the use of a single bellhousing. It should be appreciated to those skilled in the art that alternative embodiments of the method of forming the bellhousing may also be used. For example, the cone may be formed by hydroforming, pressing, or casting. The remaining steps would then be followed as described above in order to produce a universal bellhousing.

Hydroforming is a process by which a form is pressed out of a sheet of metal by the use of hydraulic pressure. The sheet of metal is placed onto a flexible diaphragm and a male mold is pressed into the sheet. Hydraulic pressure provides the energy for deforming the sheet. The flexible diaphragm provides resistance, thereby eliminating the need for a complimentary female mold. This type of metal forming is inexpensive as it does not require complimentary molds and can be used for a variety of shapes.

Pressing is a process by which a form is pressed out of a sheet of metal by a ram. The sheet of metal is placed onto a female die and a ram forces a male die onto the sheet. The sheet is then formed into the shape formed by the dies. This process is faster than hydraulic pressing, but requires more startup cost to form the dies.

Casting is a process of depositing molten metal into a form and then cooling the metal to set the form. The form must be designed for each individual bellhousing. This process requires a high startup cost, and is generally not suitable for use with high-strength steel. However, the process is preferred for large quantities of products.

Other alternative processes obvious to those in the field of art are considered to be included in this invention. The above description is merely a single embodiment and limitations to the invention are described in the patent. Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A device for connecting an engine to a transmission, each having a mounting surface, the device comprising:
    a structure having an axis, a first end, and a second end, said first and second ends each having an opening and a wall extending between said first and second ends wherein the openings are coaxial, the structure formed by deforming a spinning sheet of metal into a mold using an internal spin forming process which asserts a force to the spinning sheet of material, such force applied along an inner surface of the sheet of material as it is formed;
    said structure having an outer surface that is free of strengthening ribs in an axial direction of the structure;
    a spun formed flange formed from the spinning sheet and formed integrally with the structure, extending from the first end normal to the axis;
    a transmission plate of a plurality of interchangeable transmission plates, affixed onto the second end of the structure; and,
    a pattern of holes machined into each of the flange and the transmission plate, the pattern of holes being indexed to an engine and transmission, respectively and the pattern of holes of the transmission plate being disposed outwardly of the second end of the structure.

2. The device of claim 1, wherein the structure also comprises at least one opening formed along the wall of the structure between the first and second end.

3. The device of claim 1, wherein the material is steel.

4. The device of claim 1, wherein the material is a high strength alloy.

5. The device of claim 1, wherein the transmission plate is affixed by welding to the second end of the structure such that a first surface of the plate is essentially parallel to a surface of the flange formed at the first end of the structure.

6. The device of claim 1, wherein the tubular shape is a cone shape where the first end is wider in diameter than the second end.

7. A device for connecting an engine to a transmission, each having a mounting surface, the device comprising:
    a structure having an axis, a first end, and a second end, said structure further comprising an opening at each of said first and second ends wherein the openings are coaxial, and a wall extending between said first and second ends, the structure formed by deforming a spinning sheet of metal into a mold using an internal spin forming process which asserts a force to the spinning sheet of material, such force applied along an outer surface of the sheet of material as it is formed, said outer surface being free of strengthening ribs extending in an axial direction of the structure;
    a spun formed flange formed from the spinning sheet and formed integrally with the shape, extending from the first end of the shape normal to the axis;
    a transmission plate of a plurality of interchangeable transmission plates, affixed onto the second end of the structure; and
    a pattern of holes machined into each of the flange and transmission plate, the pattern of holes of the transmission plate being outward of the wall at the second end of the structure, the pattern of holes being indexed to an engine and transmission.

8. The device of claim 7, wherein the structure also comprises at least one opening formed along the wall of the structure between the first and second end.

9. The device of claim 7, wherein the material is steel.

10. The device of claim 7, wherein the material is a high strength alloy.

11. The device of claim 7, wherein the transmission plate is affixed by welding to the second end of structure such that a first surface of the plate is essentially parallel to a surface of the flange formed at the first end of the structure.

12. The device of claim 7, wherein the tubular shape is a cone shape where the first end is wider in diameter than the second end.

* * * * *